(12) United States Patent
Kobayashi et al.

(10) Patent No.: US 6,259,559 B1
(45) Date of Patent: Jul. 10, 2001

(54) GLASS ARRANGEMENT INCLUDING AN OUTSIDE GLASS PLATE, A POLARIZATION DIRECTION CHANGING FILM AND AN ADHESIVE LAYER THEREBETWEEN, AND AN INSIDE GLASS LAYER

(75) Inventors: Kazuya Kobayashi; Takashi Yamate; Motoh Asakura, all of Matsusaka (JP)

(73) Assignees: Central Glass Company, Limited, Ube; Nippon Oil Company, Ltd., Tokyo, both of (JP)

( * ) Notice: Subject to any disclaimer, the term of this patent is extended or adjusted under 35 U.S.C. 154(b) by 678 days.

(21) Appl. No.: 08/621,379

(22) Filed: Mar. 25, 1996

(30) Foreign Application Priority Data

Mar. 28, 1995 (JP) .................................... 7-069506
Apr. 24, 1995 (JP) .................................... 7-098878

(51) Int. Cl.$^7$ ..................................... G02B 5/30
(52) U.S. Cl. ......................... 359/485; 359/487; 359/630
(58) Field of Search ................ 359/13, 14, 483, 359/485, 487, 488, 679, 630, 634; 296/84.1; 156/106

(56) References Cited

U.S. PATENT DOCUMENTS

| | | | |
|---|---|---|---|
| 2,440,103 | * 4/1948 | Land | 359/485 |
| 3,208,902 | * 9/1965 | Arond et al. | 359/485 |
| 5,049,427 | 9/1991 | Starzewski et al. . | |
| 5,231,379 | * 7/1993 | Wood et al. | 359/630 |
| 5,352,528 | * 10/1994 | L'Her et al. | 156/106 |
| 5,510,913 | * 4/1996 | Hashimoto et al. | 359/13 |

FOREIGN PATENT DOCUMENTS

| | | |
|---|---|---|
| 0 013435 | 7/1980 | (EP) . |
| 0 171917 | 2/1986 | (EP) . |
| 0 580143 | 1/1994 | (EP) . |
| 2-141720 | 5/1990 | (JP) . |
| 2-294615 | 5/1990 | (JP) . |
| 3-228854 | 10/1991 | (JP) . |
| 6-40271 | 2/1994 | (JP) . |
| 6-273691 | * 9/1994 | (JP) .................................... 359/13 |

OTHER PUBLICATIONS

Safety Glass for Road Vehicles, JIS R–3211–1992, pp. 1536–1545 and English translation, pp. 1–15.
Test Method of Safety Glass for Road Vehicles, JIS R–3212–1992, pp. 70–83, and English translation, pp. 1–40.
Testing Methods for Yellowness Index and Change of Yellowness Index of Plastics, K7103–1977, pp. 146–149.
Patent Abstracts of Japan, Publication No. JP6255051, Patented Sep. 13, 1994.
Patent Abstracts of Japan, Publication No. JP2243544, Patented Sep. 27, 1990.

* cited by examiner

*Primary Examiner*—Darren Schuberg
(74) *Attorney, Agent, or Firm*—Crowell & Moring, L.L.P.

(57) ABSTRACT

A laminated glass to be used as a front windshield glass of an automotive vehicle, forming part of a head-up display system for displaying an image of light representing driving information on the windshield glass. The laminated glass comprises inboard-side and outboard-side glass plates of the vehicle. An intermediate film is disposed between and in contact with the inboard-side and outboard-side glass plates. A polarization-direction changing film is disposed between the first and second glass plates and bonded to the outboard-side glass plate with an adhesive containing an ultraviolet ray absorbing agent. The polarization-direction changing film functions to rotate a plane of polarization of light to be incident thereon.

17 Claims, 2 Drawing Sheets

GLASS ARRANGEMENT INCLUDING AN OUTSIDE GLASS PLATE, A POLARIZATION DIRECTION CHANGING FILM AND AN ADHESIVE LAYER THEREBETWEEN, AND AN INSIDE GLASS LAYER

BACKGROUND OF THE INVENTION

1. Field of the Invention

The present invention relates to improvements in a glass arrangement such as a laminated glass including a polarization-direction changing film, and more particularly to such a laminated glass to be used in a head-up display system which is configured, for example, such that a driver of an automotive vehicle can observe an image of driving information projected as displaying light on a windshield glass while looking a frontal view through the windshield glass in such a manner that the vehicular information is superimposed on the frontal view.

2. Description of the Prior Art

A variety of glass arrangements have been hitherto proposed and put into practical use for a head-up display system of an automotive vehicle. The glass arrangements include those of the type using a film functioning as a half mirror. These glass arrangements are configured by directly applying the half mirror on a windshield glass, or by interposing the half mirror between two glass plates. However, with these glass arrangements, reflection of light of an image is unavoidably made on the front-side or rear-side surface of the glass plate thereby forming a double image which is difficult to be observed by a driver. In view of this, the glass arrangements of another type have been proposed, in which light of the image is reflected from the surface of the glass plate without using the half mirror in order to avoid formation of the double image. One of these is configured by applying a so-called λ/2 film (for changing a direction of polarization of light) as disclosed in Japanese Patent Provisional Publication No. 2-141720. Another one is configured by bonding a transparent film having birefringence on a transparent plate, as disclosed in Japanese Patent Provisional Publication No. 2-294615. A further one is configured by bonding a polarization-direction changing film on a transparent plate, as disclosed in Japanese Patent Provisional Publication No. 6-40271. However, such conventional glass arrangements are insufficient in impact resistance and penetration resistance so that they cannot meet the requirements of the impact and penetration resistances according to safety regulations such as JIS (Japanese Industrial Standard) No. R3211 (Automotive Vehicle Safety Glass) and R3212 (Automotive Vehicle Safety Class Testing Method).

SUMMARY OF THE INVENTION

It is an object of the present invention to provide an improved glass arrangement (such as laminated glass) which can overcome the drawbacks encountered in conventional glass arrangements.

Another object of the present invention is to provide an improved glass arrangement (such as laminated glass) which is sufficiently high in impact resistance and penetration resistance so as to be safe upon being used as a windshield glass of an automotive vehicle.

A further object of the present invention is to provide an improved glass arrangement (such as laminated glass) by which broken pieces cannot drop to the side of a vehicle passenger even if the glass arrangement is broken, in case that the glass arrangement is used as a windshield glass of an automotive vehicle.

A still further object of the present invention is to provide an improved glass arrangement (such as laminated glass) which forms part of a head-up display system for an image of information, while ensuring sufficient impact and penetration resistances for an automotive vehicle windshield glass.

An aspect of the present invention resides in a glass arrangement comprising first and second glass plates which are respectively located at an inside where a person resides and an outside opposite to the inside. A polarization-direction changing film is disposed between the first and second glass plates to change a direction of polarization of light to be incident thereon. An adhesive is disposed between the polarization-direction changing film and the second glass plate to bond the polarization-direction changing to the second glass plate.

Another aspect of the present invention resides in a laminated glass comprising first and second glass plates which are respectively located at an inside where a person resides and an outside opposite to the inside. An intermediate film is disposed between and in contact with the first and second glass plates. A polarization-direction changing film is disposed between the first and second glass plates to change a direction of polarization of light to be incident thereon. An adhesive is disposed between the polarization-direction changing film and the second glass plate to bond the polarization-direction changing film to the second glass plate.

A further aspect of the present invention resides in a display system comprising a laminated glass which includes first and second glass plates which are respectively located at an inside where a person resides and an outside opposite to the inside. An intermediate film is disposed between and in contact with the first and second glass plates. A polarization-direction changing film is disposed between the first and second glass plates to change a direction of polarization of light to be incident thereon. An adhesive is disposed between the polarization-direction changing film and the second glass plate to bond the polarization-direction changing film to the second glass plate. Additionally, a display device is provided such that light is incident in a polarized state on the first glass plate of the laminated glass, the light forming an image to be observed by the person.

Accordingly, the glass arrangement (such as the laminated glass) of the present invention is sufficiently high in impact resistance and penetration resistance so as to meet the requirements according to safe regulations such as JIS (Japanese Industrial Standard) Nos. R3211 and R3212. Therefore, the glass arrangement can be suitably used as a front windshield glass of an automotive vehicle, forming part of a head-up display system for an image of light representative of information such as driving information. In the head-up display system, the double image can be effectively prevented from being formed under the action of the polarization-direction changing film, so that the image of the information can be clearly observed on the windshield glass by a person (driver) residing in a passenger compartment.

BRIEF DESCRIPTION OF THE DRAWINGS

In the drawings, like reference numerals designate like elements and parts throughout all figures, in which.

DETAILED DESCRIPTION OF THE INVENTION

Figure 1:
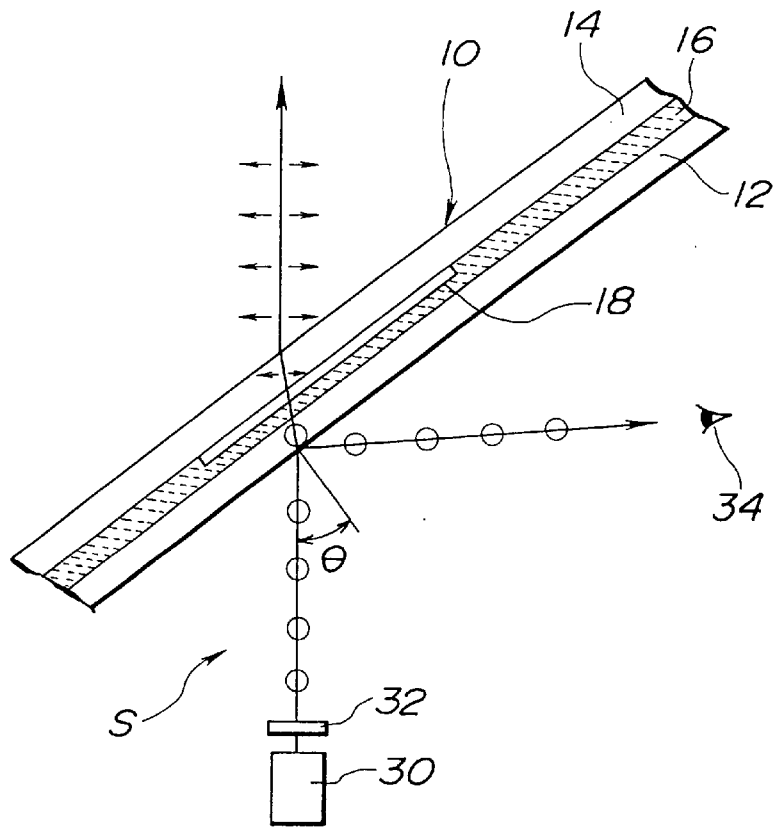
FIG. 1 is a fragmentary schematic illustration of a head-up display system including a first embodiment of a laminated glass according to the present invention.
Figure 2:
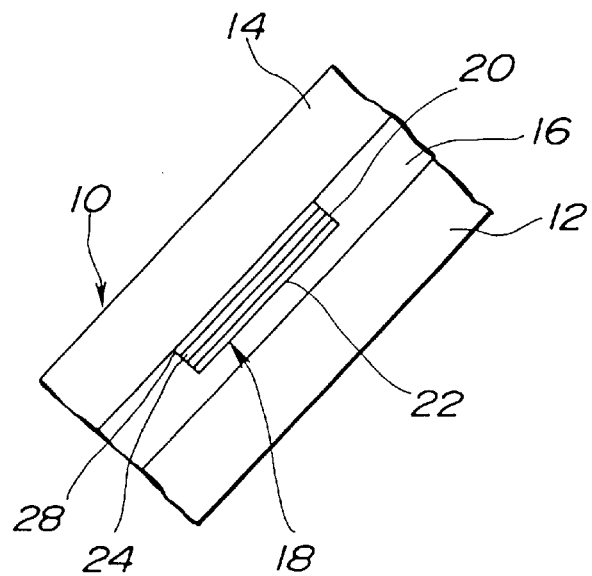
FIG. 2 is a fragmentary sectional view of an essential part of the laminated glass of FIG. 1.

Referring now to FIGS. 1 and 2 of the drawings, a first embodiment of a glass arrangement or laminated glass according to the present invention is illustrated by the reference numeral 10. In this embodiment, the laminated glass 10 is used as a front windshield glass of an automobile (not shown), and forms part of a head-up display system S which is as shown in FIG. 1 and will be discussed in detail after.

The laminated glass 10 comprises inboard-side glass plate 12 which is located to define a passenger compartment of the automobile. A driver or/and a passenger is to be located in the passenger compartment. An outboard-side glass plate 14 is located opposite to the glass plate 12 and located to contact with ambient air. An intermediate film 16 formed of, for example, polyvinyl butyral is disposed between the glass plates 12, 14 to bond the glass plates 12, 14 to each other, so that the intermediate film 16 is in contact with the outboard surface of the inboard-side glass plate 12 and with the inboard surface of the outboard-side glass plate 14.

An optical laminated film 18 is disposed between the glass plates 12, 14 and located to be embedded in the intermediate film 16. The optical laminated film 18 includes a polarization-direction changing film (or polarization-direction changing film) 20 having a thickness of 5 $\mu$m and functions to rotate a plane of polarization of light to be incident thereon. The polarization-direction changing film 20 functions to change or adjust the direction of polarization of light to be incident thereon. The polarization-direction changing film 20 in this instance includes a liquid crystal high polymer which is in twisted nematic orientation under a liquid crystal condition and is in a glassy state at a temperature lower than liquid crystal transition point thereof. The optical laminated film 18 is formed as follows: The liquid crystal high polymer is coated on a transparent substrate such as a plastic film formed of, for example, polyethylene terephthalate (PET). Then a shearing force is applied to the liquid crystal high polymer, and thereafter the liquid crystal high polymer is subjected to heat-treatment and then cooling so that a liquid crystal orientation is fixed. Examples of such a liquid crystal high polymer are a main-chain type polymer such as optically active polyester, polyamide, polycarbonate, and polyesterimide, and a side-chain type polymer such as optically active polyacrylate, polymethacrylate, and polymalonate.

A barrier layer 22 formed of an acrylic resin and having a thickness of 5 $\mu$m and a protective layer 24 formed of an acrylic resin are disposed on the opposite sides of the polarization-direction changing film 20 in a manner to be in contact with the polarization-direction changing film 20. The barrier layer 22 serves to prevent plasticizer in the intermediate film 16 from moving into the polarization-direction changing film 20. The optical laminated film 18 is adhered to the outboard-side glass plate 14 with an acrylic resin system adhesive 28 (containing an acrylic resin as a main component) containing a ultraviolet ray absorbing agent of a benzotriazole system (containing benzotriazole as the main component). It will be understood that the adhesive 28 is disposed between the inboard surface of the outboard-side glass plate 14 and the protective layer 24. Thereafter, the outboard-side glass plate 14 with the optical laminated film 18 is arranged such that the intermediate film 16 is disposed between the inboard-side and outboard-side glass plates 12, 14. Then, the thus arranged structure is subjected to an autoclave treatment, thereby obtaining the laminated glass 10 of this embodiment as shown in FIG. 2.

The thus obtained laminated glass was subjected to an impact resistance test and a penetration resistance test which were according to JIS (Japanese Industrial Standard) Nos. R3211 (Automotive Safety Glass) and R3212 (Test Method for Automotive Safety Glass), and to a light resistance test using a sunshine weatherometer.

The impact resistance test was intended to examine as to whether or not the laminated glass 10 had at least a necessary lower limit (or sufficient) stickiness or strength against a small hard flying matter. The penetration resistance test was conducted as follows: A specimen was prepared by being cut out from a laminated glass produced in a manner mentioned above or from an actual product of the laminated glass 10. The specimen was located on a support frame in such a manner that the inboard-side glass plate 12 is positioned at the upper-side to be exposed. Then, a steel ball was naturally dropped onto the upper surface of the inboard-side glass 12 from a position at a predetermined height over the surface of the inboard-side glass 12.

As a result of this impact resistance test, it was confirmed that the laminated glass of the embodiment sufficiently met the requirements of JIS. This was supposed to result from the following fact: In general, the interface between the glass plate and the intermediate film formed of polyvinyl butyral was very high in adhesive (bonding) strength, so that the interface between the outboard-side plate glass 14 and the polarization-direction changing film (with the adhesive 28) was unavoidably relatively low in adhesive strength. According to the laminated glass of this embodiment, by virtue of the fact that the polarization-direction changing film 20 was bonded to the outboard-side glass plate 14, the outboard-side glass 14 at a portion corresponding to the laminated film 18 was broken and peeled off when an impact was applied to the laminated glass 10; however, the inboard-side glass plate 12 was not peeled off even upon being broken since it was rigidly adhered to the intermediate film 16, so that the broken pieces of the inboard-side glass 12 plate was prevented from dropping to the side of the passenger compartment. In contrast, in case that the polarization-direction changing film 20 was adhered to the outboard surface of the inboard-side glass plate 12, the outboard-side glass plate 14 at a portion corresponding to the laminated film 18 was hardly peeled off from the intermediate film 16 even upon being broken when an impact is applied to the laminated glass; however, the inboard-side glass 12 at a portion corresponding to the laminated film 18 was not only broken but also peeled off and dropped to the side of the passenger compartment since the adhesive force between the laminated film 18 and the inboard-side glass plate 12 was relatively low.

The penetration resistance test was intended to examine as to whether or not the laminated glass 10 had at least a necessary lower limit (or sufficient) penetration resistance against a small hard flying matter. The penetration resistance test was conducted as follows: The specimen prepared in the same manner as that in the above-mentioned impact resistance test. The specimen was put on the support frame as same as in the above-mentioned impact resistance test. Then, the small steel ball was naturally dropped onto the inboard-side glass 12 from the position at the predetermined height over the surface of the inboard-side glass 12, in the same manner as that in the above-mentioned impact resistance test. As a result of this penetration resistance test, it was confirmed that the small steel ball could not penetrate the laminated glass 10 of this embodiment and therefore the laminated glass 10 can meet the requirements of JIS. Additionally, the same impact resistance test was conducted on a specimen which was similar to that the above-mentioned specimen (the laminated glass 10 of this embodiment) with the exception that another polarization-direction changing film such as a so-called λ/2 film was used. This test also demonstrated that the small steel ball could not penetrate the laminated glass using the λ/2 film as the polarization-direction changing film, so that such a laminated glass could meet the requirements of JIS.

The light resistance test was intended to examine as to whether or not the laminated glass 10 of this embodiment had a sufficient light resistance. The light resistance test was conducted as follows: The specimen was prepared in the same manner as that in the above-mentioned impact resistance test. Using the sunshine weatherometer, the specimen was subjected to light (sunshine) for a long time, in which a yellow degree YI of the specimen was measured at a first time before the test and at a second time after the lapse of 500 hours in the test of the sunshine weatherometer, according to JIS No. K7103. The yellow degree YI was represented by an equation [YI=100 (1.28X−1.06Z)/Y] where X, Y and Z were three stimulus values of the specimen under a standard light C in the sunshine weatherometer. As a result, the measured yellow degree YI of the laminated glass 10 of this embodiment (including the adhesive 28 containing the ultraviolet ray absorbing agent) was 8.9 at the first time and became 13.4 at the second time. This result demonstrated that the yellow degree of the laminated glass of this embodiment was hardly changed even upon a long exposure to sunlight, exhibiting a good light resistance. For the comparison purpose, the same light resistance test was conducted on a comparative specimen which was prepared in a similar manner to that of the above-mentioned specimen (corresponding to the laminated glass of this embodiment) with the exception that the adhesive 28 contains no ultraviolet ray absorbing agent. As a result, the measured yellow degree YI of the comparative specimen was 8.3 at the first time and became 62.0 at the second time. Thus, the comparative specimen was largely yellowed under the action of light, exhibiting a low light resistance.

Next, the head-up display system S using the laminated glass 10 of the embodiment will be discussed.

The laminated glass 10 of this embodiment is installed to the automobile vehicle body to be used as the front windshield glass. The head-up display system S includes a displaying device 30 such as a C.R.T., a fluorescent display tube, a liquid crystal display or the like. The displaying device 30 generates a display light such as driving information or the like, and is arranged such that the display light is incident at Brewster's angle (θ=56.3°) on the laminated glass 10. The display light includes S-wave and P-wave and is incident to a S-wave polarizing device 32, so that the display light from the displaying device 30 is polarized to transmit S-wave. The S-wave is incident on the inboard-side glass plate 12 and reflected by the inboard surface (the interface between air and the glass surface) of the glass plate 12, and reaches eyes 34 of the driver, so that the driver can observe the driving information or the like on the front windshield glass. It will be understood that a part of S-wave incident on the laminated glass 10 enters the inboard-side glass plate 12 and reaches the polarization-direction changing film 20 through the intermediate film 16, so that S-wave is rotated into P-wave. As a result, the S-wave is hardly reflected at the interface between the outboard surface of the outboard-side glass plate 14, and therefore the almost whole P-wave can outgo from the outboard-side glass plate 14. Accordingly, the driver can clearly observe the displayed image of the driving information or the like while preventing double image from being formed on the laminated glass 10.

Figure 3:
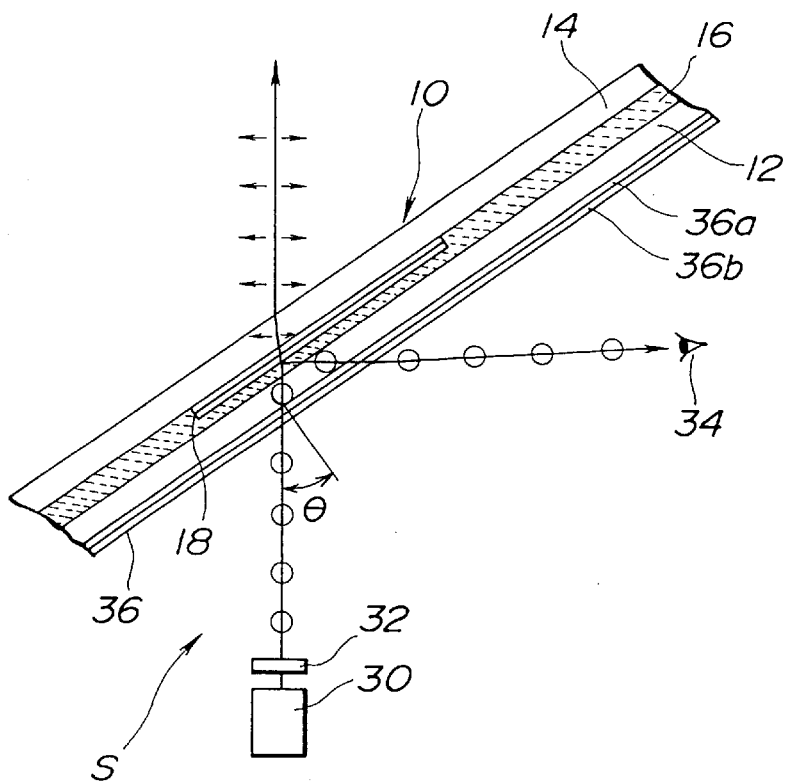
FIG. 3 is a fragmentary schematic illustration of a head-up display system including a second embodiment of the laminated glass according to the present invention.
Figure 4:
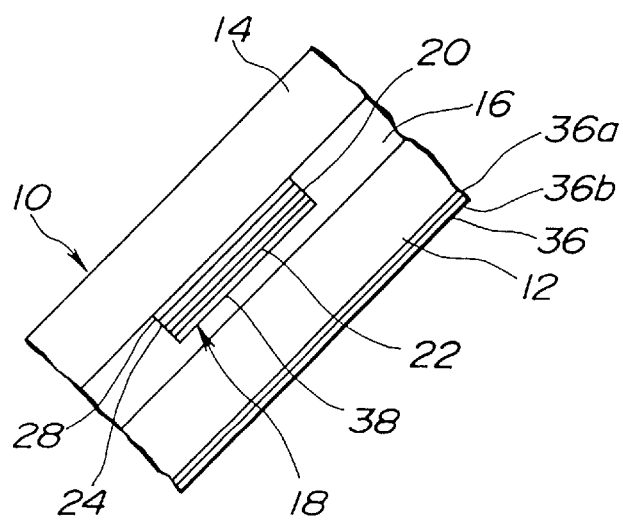
FIG. 4 is a fragmentary sectional view of an essential part of the laminated glass of FIG. 2.

FIGS. 3 and 4 illustrate a second embodiment of the laminated glass 10 according to the present invention, similar to the first embodiment laminated glass of FIGS. 1 and 2. The structure of the laminated glass 10 of this embodiment will be discussed with reference to a production method of the laminated glass 10.

First, the inboard-side glass plate 12 is treated as follows: An alkoxide solution is prepared by mixing Ti alkoxide and Si alkoxide in a mol ratio of 48:52 to obtain a mixture, and then by adding a solvent such as isopropyl alcohol to the mixture. Subsequently, a masking tape (not shown) is applied on the outboard surface of the inboard-side glass plate 12. Then, the glass plate 12 is dipped in the prepared alkoxide solution and drawn up at a predetermined rate. After the masking tape is removed, the glass plate 12 is heated at about 270° C. for about 10 minutes thereby forming a first layer antireflection film 36a. Further, a masking tape similar to the above-mentioned one is applied to the outboard surface of the inboard-side glass plate 12, and then the glass plate 12 is dipped in a Si alkoxide solution. After the glass plate 12 is drawn up from the alkoxide solution at a predetermined rate, the masking tape is removed and heated at about 270° C. for about 10 minutes, thereby forming a second layer antireflection film 36b.

Thereafter, the inboard-side glass plate 12 is located together with the outboard-side glass plate 14 in a firing furnace to be subjected to a bending treatment at about 620° C., in which the first layer antireflection film 36a and the second layer antireflection film 36b are fired so that the first layer antireflection film 36a becomes a composite thin film of $TiO_2$ and $SiO_2$ while the second layer antireflection film 36a becomes a thin film of $SiO_2$. These first and second layer antireflection films 36a, 36b constitute an antireflection film 36 formed on the inboard surface of the inboard-side glass plate 12.

Then, the barrier layer 22 formed of an acrylic resin and having a thickness of 5 μm and the protective layer 24 formed of the acrylic resin having a thickness of 5 μm are disposed on the opposite sides of the polarization-direction changing film 20 having a thickness of 5 μm in a manner to be in contact with the polarization-direction changing film 20. The barrier layer 22 serves to prevent plasticizer in the intermediate film (formed of polyvinyl butyral) 16 from moving into the side of the polarization-direction changing film 20. Additionally, a metallic film such as an Al (aluminum) film having a thickness of about 50Å is formed on the barrier layer 22 to serve as a light-transmittable reflection film 38, under vacuum deposition or sputtering. The light-transmittable reflection film 38 is adapted such that light is transmittable therethrough like a half mirror. Thus, the optical laminated film 18 is formed. The optical laminated film 18 is adhered to the outboard-side glass plate 14 (subjected to the bending treatment) with the acrylic resin system adhesive 28 containing the ultraviolet ray absorbing agent of the benzotriazole system. It will be understood that the adhesive 28 is disposed between the inboard surface of the outboard-side glass plate 14 and the protective layer 24. Thereafter, the outboard-side glass plate 14 with the optical laminated film 18 is arranged such that the intermediate film (formed of polyvinyl butyral) 16 is disposed between the inboard-side and outboard-side glass plates 12, 14 so as to accomplish a tentative bonding. Then, the thus arranged structure is subjected to a usual autoclave treatment, thereby obtaining the laminated glass 10 of this embodiment as shown in FIG. 4.

The above-discussed laminated glass of this embodiment is used as a part of the head-up display system S. More specifically, the laminated glass 10 of this embodiment is installed to an automobile body to be used as the front windshield glass. The head-up display system S includes the displaying device 30 such as a C.R.T., a fluorescent display tube, a liquid crystal display or the like. The displaying device 30 generates a display light such as driving information or the like, and arranged such that the display light is incident at Brewster's angle ($\theta$=56.3°) on the laminated glass 10. The display light includes S-wave and P-wave and is incident to a S-wave polarizing device 32, so that the display light from the displaying device 30 is polarized to transmit S-wave.

The S-wave is incident on the inboard-side glass plate 12 but is hardly reflected by the inboard surface (the interface between air and the glass plate) of the glass plate 12 under the action of the antireflection film 36. Accordingly, the almost whole light enters the laminated glass 10. The thus entering light reaches and is reflected by the light-transmittable reflection film 38 to be observed by the eyes 34 of the driver as shown in FIG. 3.

The light passing through the light-transmittable reflection film 38 reaches the polarization-direction changing film 20 to be rotated into P-wave, and thereafter enters the outboard-side glass plate 14. The light passing through the outboard-side glass plate 14 outgoes from the outboard surface (the interface between air and the glass plate) of the outboard-side glass plate 14, in which the outgoing angle of the light is Brewster's angle and therefore no reflection is made so that the whole light outgoes as the P-wave. As a result, double image cannot be formed and therefore a clear image of the driving information or the like can be observed by the driver. It has been experimentally confirmed that the reflectivity of the laminated glass 10 of this embodiment is about 25% at which the driver can clearly observe the displayed image of the information or the like transmitted from the displaying device 30.

While only the laminated glass 10 has been shown and described as a part of the head-up display system S in the second embodiment of FIGS. 3 and 4, it will be understood that a single glass plate (not shown) may be disposed at the inboard side relative and separate from a windshield glass (not shown), in which the single glass plate is provided with the light-transmittable reflection film 38 and the polarization-direction changing film 20 which are laminated and adhered to the outboard surface of the single glass plate, and the antireflection film 36 is formed on the inboard surface of the single glass plate. With this arrangement, the display light (the driving information or the like) in the state of S-wave is incident and passes through on the inboard-side single glass plate. The light is reflected by the light-transmittable reflection film 38 at the outboard surface of the single glass plate, so that the displayed image of the information or the like is formed in front of and observed by the driver.

Although the light-transmittable reflection film 38 has been described as being the Al film in the second embodiment of FIGS. 2 and 3, it will be appreciated that the light-transmittable reflection film may be a variety of films such as a thin film formed of Au, Ag or Cu, or composite films formed of indium oxide and tin oxide.

While the laminated glass 10 has been shown and described as being used as the front windshield glass of the automobile, it will be appreciated that the laminated glass is high in penetration resistance and impact resistance and therefore may be used as a windshield glass of other vehicles such as a ship, an airplane and a tramcar.

The laminated glass has been shown and described as including the polarization-direction changing film whose liquid crystal high polymer is in twisted nematic orientation under liquid crystal condition and is in glassy state at a temperature lower than a liquid crystal transition point thereof. This is preferable from the view point of preventing double image from being formed throughout a whole visible region. However, it will be appreciated that the above-type of the polarization-direction changing film may be replaced with other polarization-direction changing films such as a transparent film having a birefringence, and the $\lambda/2$ film or plate.

What is claimed is:

1. A laminated glass defining a passenger compartment of an automobile, comprising:

first and second glass plates which are respectively located at an inside where a person resides and an outside opposite to the inside;

an antireflection film formed on an inside surface of said first glass plate;

an intermediate film disposed between and in contact with said first and second glass plates;

a polarization-direction changing film disposed between the first and second glass plates for changing a direction of polarization of light to be incident thereon;

a light-transmittable reflection film disposed between said polarization-direction changing film and said first glass plate;

an adhesive disposed between said polarization-direction changing film and said second glass plate to bond said polarization-direction changing film to said second glass plate; and means by which said polarization-direction changing film is separate from said first glass plate so that said intermediate film resides between said polarization-direction changing film and said first glass plate.

2. A laminated glass as claimed in claim 1, wherein said polarization-direction changing film is an polarization-direction changing film which includes a polarization-direction changing element formed of a liquid crystal high polymer which is in twisted nematic orientation under liquid crystal condition and is in glassy state at a temperature lower than liquid crystal transition point thereof.

3. A laminated glass as claimed in claim 1, wherein said intermediate film is formed of a plastic.

4. A laminated glass as claimed in claim 1, wherein said adhesive contains an ultraviolet ray absorbing agent.

5. A display system, comprising:

a laminated glass defining a passenger compartment of an automobile, including first and second glass plates which are respectively located at an inside where a person resides and a outside opposite to the inside;

an antireflection film formed on an inside surface of said first glass plate;

an intermediate film disposed between and in contact with said first and second glass plates, a polarization-direction changing film disposed between the first and second glass plates to change a direction of polarization of light to be incident thereon, a light-transmittable reflection film disposed between said polarization-direction changing film and said first glass plate;

an adhesive disposed between said polarization-direction changing film and said second glass plate to bond said polarization-direction changing film to said second glass plate;

means by which said polarization-direction changing film is separate from said first glass plate so that said intermediate film resides between said polarization-direction changing film and said first glass plate; and means by which light is incident in a polarized state on said first glass plate of said laminated glass, said light forming an image to be observed by the person.

6. A display system as claimed in claim 5, wherein said light incident means includes means by which the light is incident on said first glass substantially at Brewster's angle.

7. A laminated glass assembly usable as an automotive vehicle front windshield forming part of a heads up display system, comprising:

a first glass plate which in use is located at a vehicle passenger space side, an antireflection film formed on an inside surface of said first glass plate, a second glass plate which in use is located at a vehicle outboard side, an intermediate film disposed between said first and second glass plates a polarization-direction changing film disposed between said first and second glass plates and extending over only a portion of mutually facing surface areas of said first and second glass plates to form a heads up display section of said windshield, and a light-transmittable reflection film disposed between said polarization-direction changing film and said first glass plate, wherein said first and second glass plates are in contact with said intermediate film in areas other than said heads up display section, and wherein said intermediate film is disposed between the first glass plate and said polarization light direction changing film.

8. A laminated glass assembly according to claim 7, comprising an adhesive disposed between said polarization light direction changing film and the second glass plate.

9. A laminated glass assembly according to claim 8, wherein said intermediate film has a recess at its side facing the second glass plate, said polarization light direction changing film being disposed in said recess.

10. A laminated glass assembly according to claim 9, wherein said intermediate film is formed of polyvinyl butyral.

11. A laminated glass assembly according to claim 10, wherein said polarization-direction changing film is a polarization-direction changing film which includes a polarization-direction changing element formed of a liquid crystal high polymer which is in twisted nematic orientation under liquid crystal condition and is in glassy state at a temperature lower than liquid crystal transition point thereof.

12. A laminated glass assembly according to claim 11, further comprising an antireflection film formed on the inside surface of said first glass plate, and a light-transmittable reflection film disposed between said polarization-direction changing film and said first glass plate.

13. A laminated glass assembly according to claim 12, wherein said adhesive contains an ultraviolet ray absorbing agent.

14. A laminated glass assembly according to claim 8, wherein said intermediate film is formed of a plastic.

15. A laminated glass assembly according to claim 8, wherein said intermediate film is formed of polyvinyl butyral.

16. A laminated glass assembly according to claim 8, wherein said polarization light direction changing film includes a polarization-direction changing element formed of a liquid crystal high polymer which is in twisted nematic orientation under liquid crystal condition and is in a glassy state at a temperature lower than a liquid crystal transition point thereof.

17. A laminated glass assembly according to claim 8, wherein said adhesive contains an ultraviolet ray absorbing agent.

* * * * *